US007150492B2

(12) United States Patent
Nania

(10) Patent No.: US 7,150,492 B2
(45) **Date of Patent: *Dec. 19, 2006**

(54) DOUBLE-PIVOT HINGE FOR MOTOR VEHICLE DOOR

(75) Inventor: Adrian Nania, Rochester, MI (US)

(73) Assignee: Edscha Roof Systems Inc., Pontiac, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,683

(22) Filed: Sep. 3, 2004

(65) Prior Publication Data

US 2005/0184556 A1 Aug. 25, 2005

Related U.S. Application Data

(63) Continuation of application No. 10/663,017, filed on Sep. 15, 2003, now Pat. No. 6,817,063, which is a continuation of application No. 09/996,543, filed on Nov. 28, 2001, now Pat. No. 6,629,337.

(51) Int. Cl.
*B60J 5/00* (2006.01)

(52) U.S. Cl. ..................... 296/146.12; 16/366; 16/334; 16/342

(58) Field of Classification Search ........... 296/146.11, 296/146.12; 16/334, 366, 371, 342
See application file for complete search history.

(56) References Cited

U.S. PATENT DOCUMENTS 4,700,984 A * 10/1987 Kinaga et al. ......... 296/146.11
6,305,737 B1 * 10/2001 Corder et al. .......... 296/146.11
6,606,763 B1 * 8/2003 Bruckner ..................... 16/366

FOREIGN PATENT DOCUMENTS

| | | |
|---|---|---|
| JP | 55-101263 | 7/1980 |
| JP | 57-46014 | 3/1982 |

OTHER PUBLICATIONS

Presentation entitled "Ford 180° Hinge Concept Ready Review" (Nov. 2000).

* cited by examiner

*Primary Examiner*—Jason Morrow
(74) *Attorney, Agent, or Firm*—Davidson, Davidson & Kappel, LLC

(57) ABSTRACT

A double pivot notch-brake hinge for securing a door to a motor vehicle body, including a first leaf or connector securable to a door pillar of the vehicle body, a second leaf or connector securable to the door, and a U-shaped link pivotally connecting the first and the second leaves. The U-shaped link has two opposite legs at its respective ends, and gudgeons for receiving hinge pins and defining, respectively, pillar-side and door-side pivot connections of the U-shaped link with the first and the second connectors. The pillar and door side pivots are checked with a resistance pivot using a notch-brake mechanism, which allows controlled movement of the pivot.

23 Claims, 8 Drawing Sheets

DOUBLE-PIVOT HINGE FOR MOTOR VEHICLE DOOR

CROSS-REFERENCE TO RELATED APPLICATIONS

This application is a continuation of U.S. patent application Ser. No. 10/663,017, filed Sep. 15, 2003, which is now U.S. Pat. No. 6,817,063. U.S. patent application Ser. No. 10/663,017 was filed as a continuation to U.S. patent application Ser. No. 09/996,543, filed on Nov. 28, 2001, which is now U.S. Pat. No. 6,629,337.

BACKGROUND OF THE INVENTION

The present invention relates generally to door hinges for a motor vehicle, and more particularly to a double pivot door hinge for permitting a greater than ninety degree opening of a vehicle door.

U.S. Pat. No. 4,719,665 discloses a double pivot hinge for vehicle doors. A first and second latch means are alternately movable between latched and unlatched positions to either latch the hinge arm to one hinge butt mounted to the door to permit a 90-degree movement, or to latch the hinge arm to another hinge butt mounted to the vehicle for 90 to 180 degree movement.

U.S. Pat. Nos. 5,561,887 and 5,685,046 disclose vehicle double pivot door hinges. The door rotates about the vehicle-mounted pivot for a zero to 90 degree movement, the vehicle-mounted pivot being locked releasably in the 90 degree position, for example by a ball detent. Ball detents or cams exterior to the door-mounted pivot keep the door-mounted pivot from moving during the zero to 90-degree action. These ball detents or cams then release to permit the door-mounted pivot to rotate, so that a 90-degree to 180-degree motion can be achieved.

The actual pivots of these double-pivot prior art devices all have the same or no resistance, so that external latches or devices are required to provide the desired movements and braking.

U.S. Pat. No. 5,918,347, assigned to Edscha and hereby incorporated by reference herein, shows a door hinge with a resistance pivot where a locking member acts directly on a cylinder stem having grooves. The reistance pivot can provide for door opening angles up to 270 degrees. However, only a single pivot is provided.

SUMMARY OF THE INVENTION

An object of the present invention is to provide a double-pivot door hinge that permits more than a ninety-degree rotation of the door of the vehicle having a simplified and/or reliable construction. Another alternate or additional object is to permit a double-pivot door hinge door hinge to provide various locking positions at various angles over a range of door movement.

The present invention provides a double pivot door hinge for a motor vehicle comprising:

a door connector for connecting to a door of the motor vehicle;

a pillar connector for connecting to a door pillar or body of the motor vehicle; and a link connected to the door connector at a door-side pivot and connected to the pillar connector at a pillar-side pivot;

a braking resistance of the pillar-side pivot being less than a braking resistance of the door-side pivot during opening.

By having the braking resistances directly at the pivots be different, a simplified and more relaiable construction can result. In the prior art devices, the pivots themselves had similar or no resistances, and the braking resistances were provided exteriorly to the pivots.

Moreover, as a result of the braking resistance of the pillar-side pivot being less that the braking resistance of the door-side pivot, upon opening of the door to a certain intermediate position, for example 90 degrees, the door pivots about the pillar-side pivot while door-side pivot remains fixed.

Preferably, a stop is provided to prevent the pillar-side pivot from rotating past the intermediate position. At this point further pulling of the door with a force greater than the braking resistance of the door-side pivot results in the door-side pivot rotating so that the door can be moved from the intermediate point to a fully open position, for example 180 degrees.

During closing, the braking resistance of the door-side pivot then may be less than the braking resistance of the pillar-side pivot, so that the door-side pivot first rotates to close the door from the fully-opened position to the intermediate position.

Another stop can be provided to prevent the door-side pivot from rotating past the intermediate position as the door is being closed.

The double pivot hinge according to the present invention makes it possible, during opening and closing of the door, to provide for predetermined movement of the door using reistance pivots. Use of further connections exterior to the pivots to provide resistance can be avoided.

The link is preferably a U-shaped link.

Preferably, the door and pillar side pivots include a locking member, such as a needle roller, biased against a hinge pin pivotally received in a gudgeon of the respective door or pillar connector. The pivots are also received in gudgeons of the link.

The pivot resistance mechanism involves a use of a sleeve-shaped cam which has pre-determined notches cut into it to provide door open positions. Preferably, on the cam rides a needle roller, which is forced against the cam by a spring. As the roller rides on the cam during pivotal movement, door braking positions are created as the roller enters into the notches on the cam profile. The braking resistance is achieved when the roller rolls out of the notch. The braking resistance can be modified by the sizes of the notches, and by the sizing of the rollers.

Preferably, each pivot has has a cam with two notches. Three locking positions upon the pivotal movement of the link about the two pivots are thus established: one the fully-closed position of the door (zero degrees), a second at an intermediate position, for example 90° and a third at a fully open position, for example at 180°. When the door is closed at 0°, the pillar-side and the door-side pivot rollers are both in the respective first notches in the cam. When the door is opened to the intermediate position the pillar-side pivot travels so that the roller of the locking mechanism engages a second notch on the pillar-side cam. The door-side pivot remains with its locking mechanism roller in the first notch, due to the larger resistance on the door side pivot.

When the door is opened further from the intermediate position to the fully open position, the door-side pivot travels so that its locking mechanism roller engages the second notch of the door-side cam.

Preferably, a positive stop is also provided, so that the full open door, which may have a tendency to crash to the body in extreme torque applications, avoids travel past the fully open position, or a position slightly past the fully open position.

The different braking resistances can be achieved by different pre-loading of the compression springs, different profiling of the locking member (roller) or of the surface of the respective cam of the hinge pin.

The size and weight of the door often dictates that only one hinge cannot hold the door in position both for rotational and twist rigidity.

A second hinge assembly thus may be provided. The door with two hinge assemblies can provide heavier doors proper support during rotation, the hinge assemblies being positioned with the hinge gudgeons coaxial with each other.

The second hinge assembly may be similar to the resistance hinge according to the present invention, as having two resistance hinges can provide better control and more stiffness and rigidity. However, control of the movement of both the resistance hinge assemblies simultaneously with repetitive results may be difficult from a manufacturing standpoint. To avoid this, the present invention preferably provides the notch-braking mechanism for the one of the hinge assemblies while the other hinge assembly is lock- or resistance-free. The resistance-free hinge has a similar construction to the resistance hinge, with the door and body connectors connected using a U-shaped link at the two gudgeons. The bending stiffness is provided by connecting the resistance hinge and the resistance-free hinge using a rod or connecting element which transmits the controlled movement of the door and the pillar-side pivot of the resistance hinge to the resistance-free hinge assembly.

The two pivot axes of the pillar-side and the door-side pivots preferably are slightly off parallel to each other so as to provide for a door assist. This arrangement of the pivot axes makes it possible, upon pivoting of the door, to have a variable door assist as the door is cycled. Particularly, when the door is being opened from the intermediate to the fully open position, the door assist helps the door to move to the final fully-open position. While in closing mode from the intermediate to the closed position, the door assist aids the door in latching.

Preferably, the planar base of the pillar connector is attached to the outer surface of the pillar, and the planar base of the door connector is attached to the side of the door so that the two base plates are arranged in mutually perpendicular planes.

A particular favorable feature of the invention includes that the double pivot hinge is so secured that it is not visible from the outside, insuring an aesthetic appearance of the vehicle. The hinge remains hidden from an outsider when the door is closed. The sheet panels of the door and the body may be closely aligned with each other with a small gap.

BRIEF DESCRIPTION OF THE DRAWINGS

The present invention itself, both as to its construction and its mode of operation, together with additional advantages and object thereof, will be best understood from the following detailed description of a preferred embodiment, in which:

FIG. 6A shows the resistance hinge assembly in a full closed position for a side cargo door application, while

FIG. 7A shows the resistance hinge assembly in an intermediate position for a side cargo door application, while FIG. 8A shows the resistance hinge assembly in a fully open position for a side cargo door application, while

DETAILED DESCRIPTION OF THE PREFERRED EMBODIMENT

Figure 1:
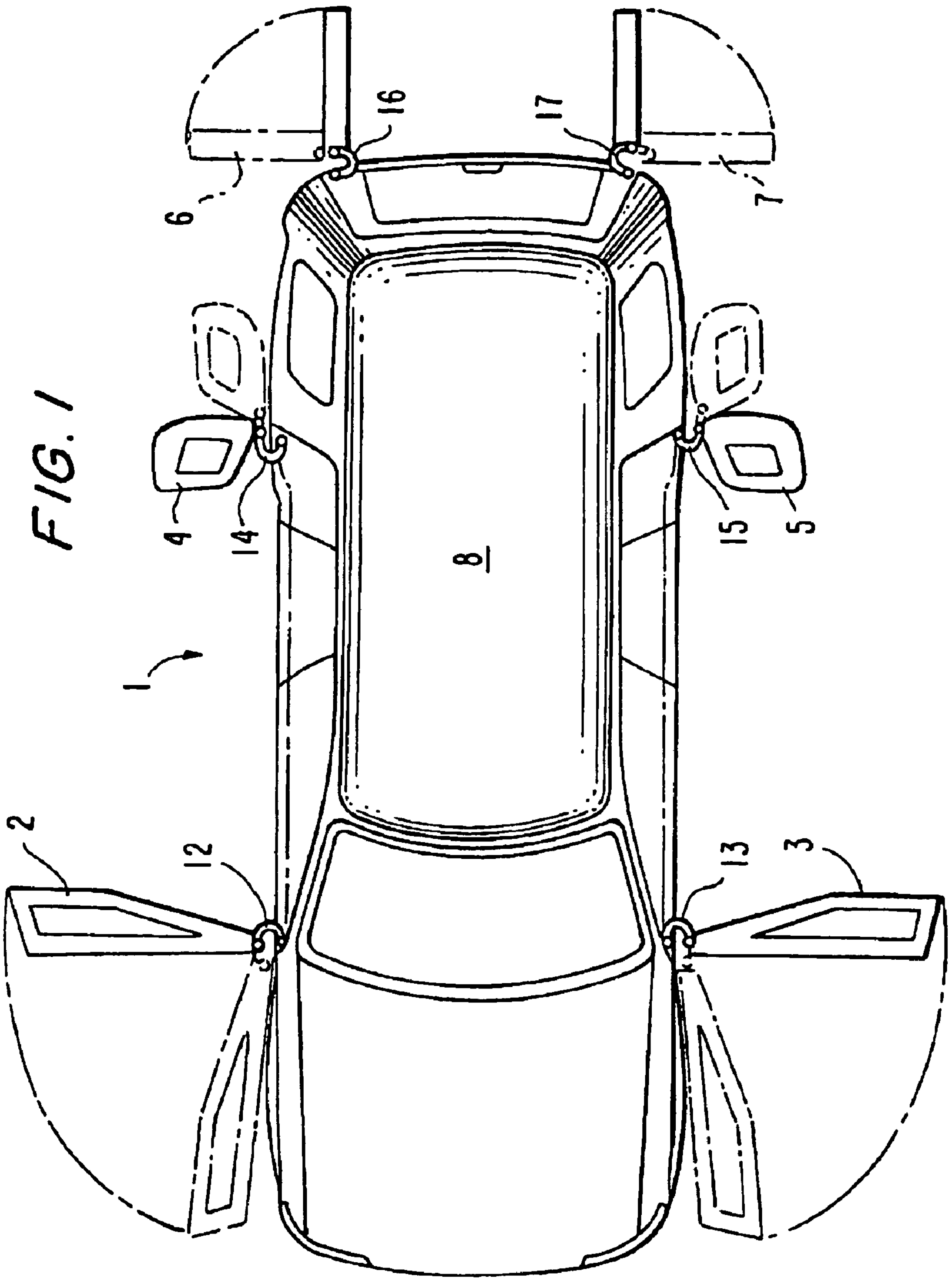
FIG. 1 shows schematic plan view of a motor vehicle body and doors with hinges according to the present invention.

FIG. 1 shows a motor vehicle 1, for example a cargo truck, having a total of six doors 2, 3, 4, 5, 6, 7 secured to corresponding parts of the motor vehicle body 8 by hinges 12, 13, 14, 15, 16, 17 respectively. The two front doors 2, 3 and the two side cargo doors 4, 5 open up to 180° towards the front and the rear of the vehicle respectively. Also two rear cargo doors 6, 7 are shown opening away from each other (a so-called dutch door). For securing the doors to the vehicle body, double pivot notch-brake hinges 12, 13, 14, 15, 16 and 17 according to the present invention are used.

Figure 2:
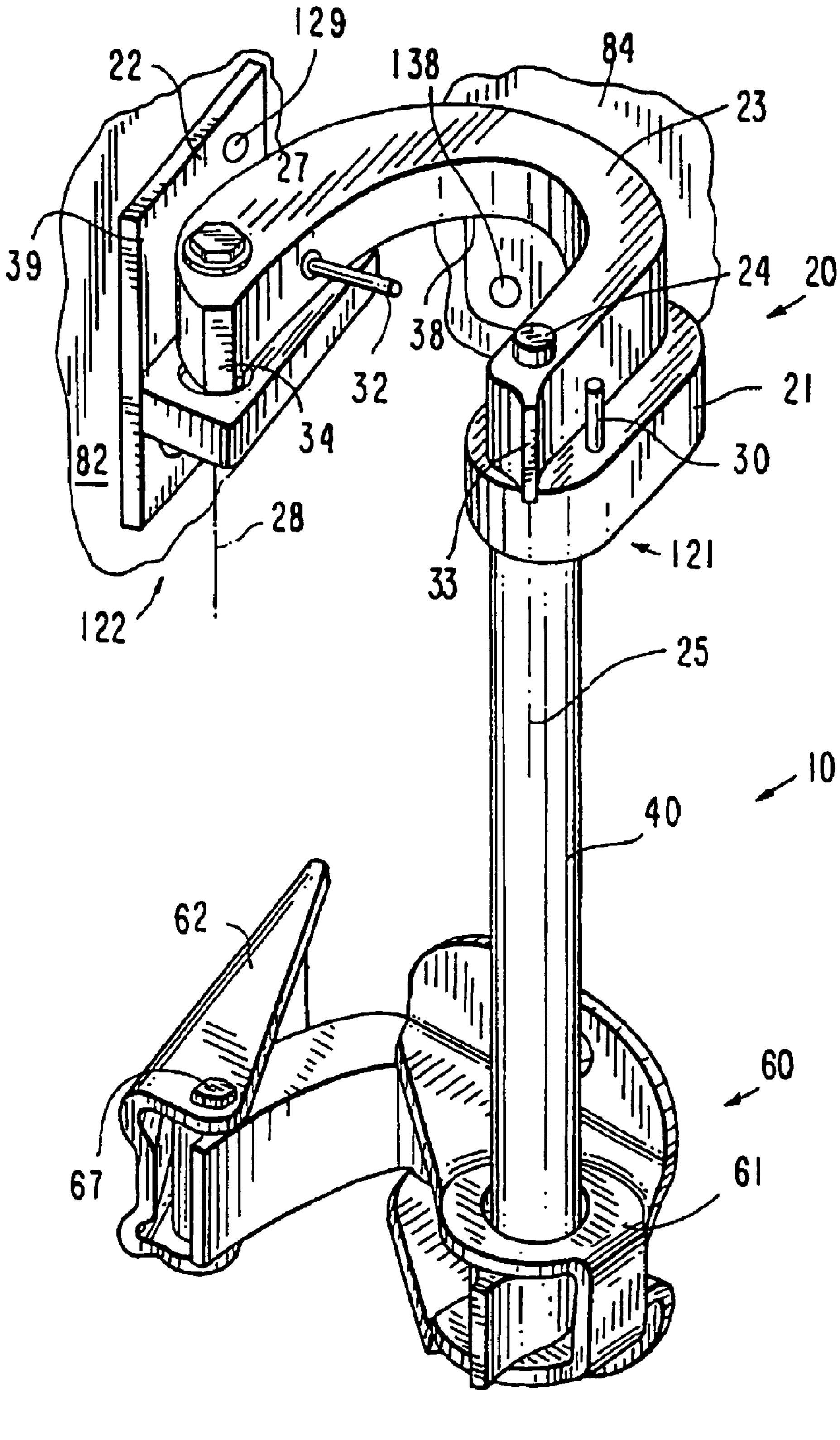
FIG. 2 shows a perspective view of the double pivot notch-brake hinge according to the preferred embodiment, with two hinge assemblies.

FIG. 2 shows a preferred double pivot notch-brake hinge 10 for attaching a door 82 (shown schematically) to a pillar 84 (shown schematically) of the vehicle body 9. Hinge 10 includes three main components: a resistance hinge assembly 20, a connecting member 40 and a resistance-free hinge assembly 60.

Figure 3:
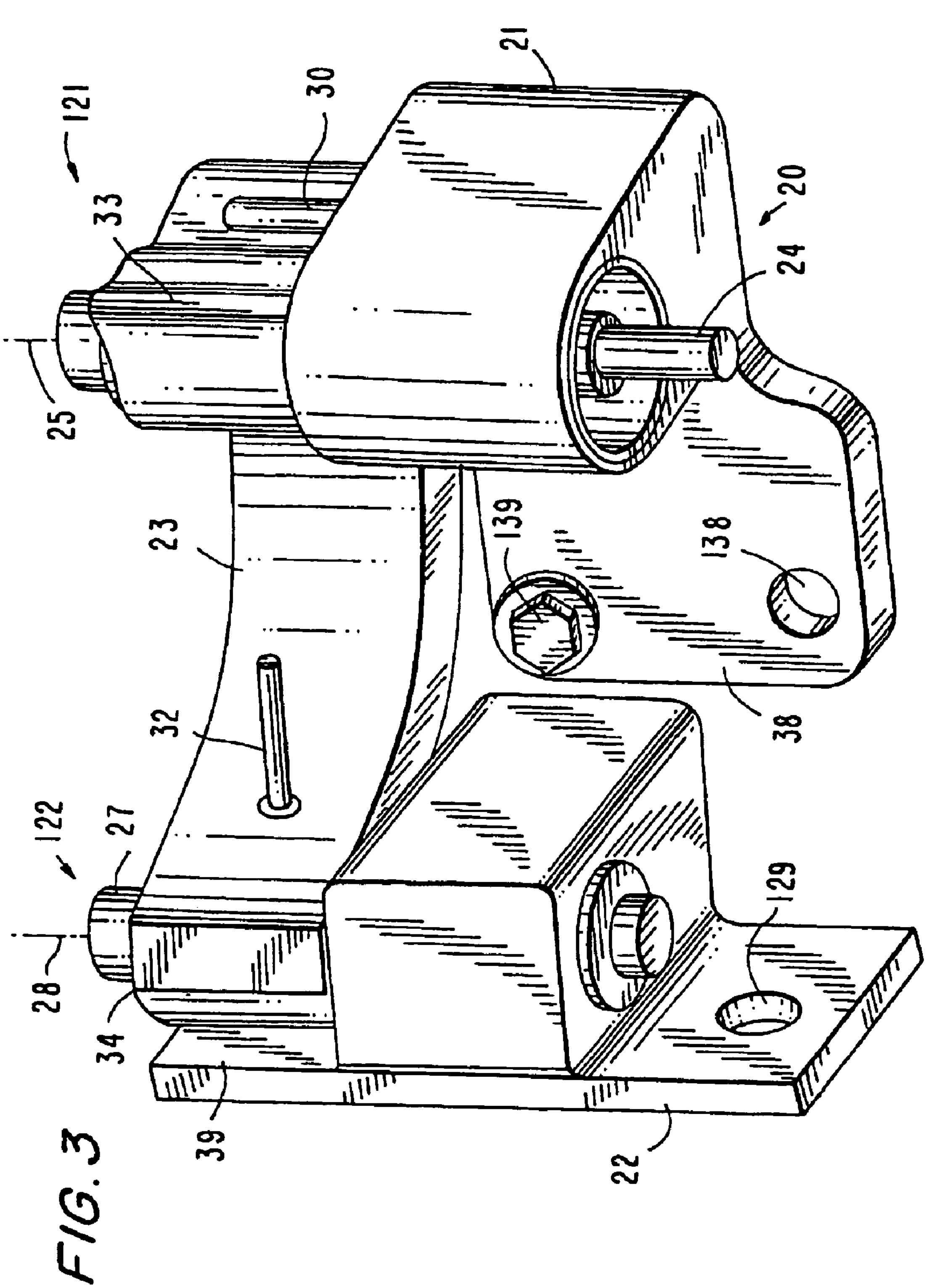
FIG. 3 shows a detailed view of the resistance hinge assembly of FIG. 2.

The resistance hinge assembly 20, shown as well in FIG. 3 in a bottom perspective view, includes a pillar or body connector 21, such as a leaf, having a planar base 38 attachable to the door pillar 84, for example via bolts 139 through hole 138. Assembly 20 also includes a door connector 22 having a planar base 39 with holes 129 for bolting the connector to the door 82. Planes formed by planar base 39 and planar base 38 preferably are perpendicular to each other when door 82 is in a closed position.

Pillar connector 21 provides a bore for receiving a pillar hinge pin 24. Pillar hinge pin 24 and the bore define a pillar side pivot 121 of the double pivot hinge 10.

A U-shaped link 23 has bores at its two ends for forming a connection with the respective connectors 21, 22. Pillar hinge pin 24 fits through one bore, so that U-shaped link is connected to pillar connector 21, thereby forming a pillar-side rotational axis 25, about which link 23 can rotate with respect to pillar connector 21.

Door connector 22 also has a bore for receiving a door hinge pin 27, thereby defining a door-side pivot 122. The other bore of link 23 also receives door hinge pin 27, so that link 23 also can rotate about a door-side rotational axis 28.

Pins 24 and 27 are fixed with respect to U-shaped link 23, and rotate with respect to door connector 22 and pillar connector 21.

Link 23 has stops 32, 33 and 34 for limiting movement of link 23. Stops 32 and 34 interact with planar base 39, and stop 33 with a stop pin 30, as will be described.

Hinge pin 24 is fixedly connected to connecting member 40, which is for example a rod. Second resistance-free assembly 60, shown also in FIG. 5, includes a pillar connector 61 and a door connector 62, as well as a U-shaped link 63 rotatable at both end with respect to connectors 61 and 62. A pin 67 has a same axis of rotation as axis 28, and connecting member 40 connects to a hinge pin in link 63, the hinge pin having the same axis of rotation at axis 25.

As will be described with respect to FIGS. 4, 6A, 6B, 7A, 7B, 8A and 8B, both the body-side pivot 122 and the door- or pillar-side pivot 121 of resistance hinge assembly 20 preferably are notch pivots having a high braking resistance against pivotal movement at at least two locations. The braking resistance is created by two notches in cams of pivots 121 and 122 at precise pivotal angles, thus creating three different door angles.

Figure 4:
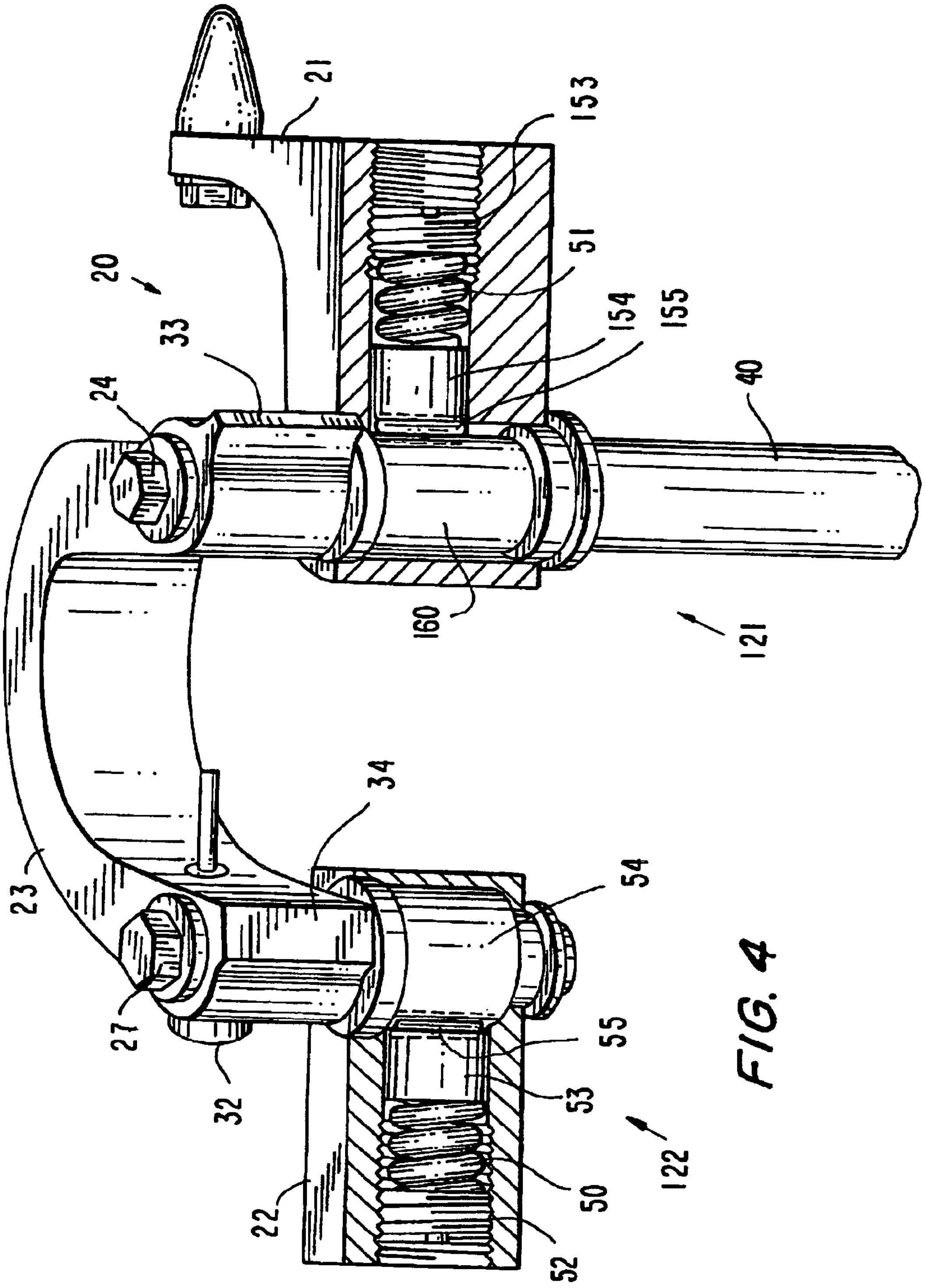
FIG. 4 shows a detailed view of the internal mechanism of the resistance notch brake hinge assembly of FIG. 3.

FIG. 4 shows a partial cross-sectional view of pivots 122 and 121 with the door in its fully-open position. Pivot 121 includes an internal braking mechanism having a spring support 153, a compression spring 51, a plunger 154 and a needle roller 155. Plunger 154 forces needle roller 155 against a cam 160 of pivot 121. Cam 160 is fixedly connected to hinge pin 24, and includes a first notch and a second notch. Between the closed-door position and an intermediate door position, needle roller 155 moves between the two notches. In the intermediate to fully-open position, needle roller 155 remains in the second notch.

Compression spring 51 is held in a bore of the pillar connector 21, and spring support 153 may be a cap screw that closes the bore and forms the first support for the compression spring 51, which is supported, at its opposite end, against plunger 154. The threaded connection of support 153 permits removal and adjustment of the biasing force of the compression spring 51. The compression spring 51 preferably is formed as a helical coil spring. The bore containing spring 51 extends up to sleeve-shaped cam 160, which is held on pin 24 of connecting member 40 with a spline connection, which locks the cam 160 onto the pin 24. The pin 24 is rigidly connected to the U-link 23 with a slot and a keyway on pin 24. The pin 24 may secured axially using a bolt and nut connection. FIG. 3 shows a bottom end of pin 24.

Pin 24 allows a rigid connection to U-link 23 and to cam 160. The sleeve-shaped cam 160 is provided with external notches at required locations on the circumference of the cam 160. The notches run in an axial direction and act as checkpoints. As cam 160 rotates the needle roller 155 rides on the cam 160. The geometry of the cam 160 with the notches and any ramps forces the spring to compress and expand rendering different resistant forces for the pivotal movement. Two notches preferably are located at 90° from one another, which gives the braking resistance required by the door at the closed position and at an intermediate 90° open door position.

Door-pivot 122 likewise includes a spring support 52, a compression spring 50, a plunger 53, a needle roller 55, and cam 54. Cam 54 is fixed to pin 27, which is fixed to U-shaped link 23. Two notches are likewise provided on cam 54 for holding the door at the intermediate position and the fully open position, for example, 90° and 180° respectively.

Figure 5:
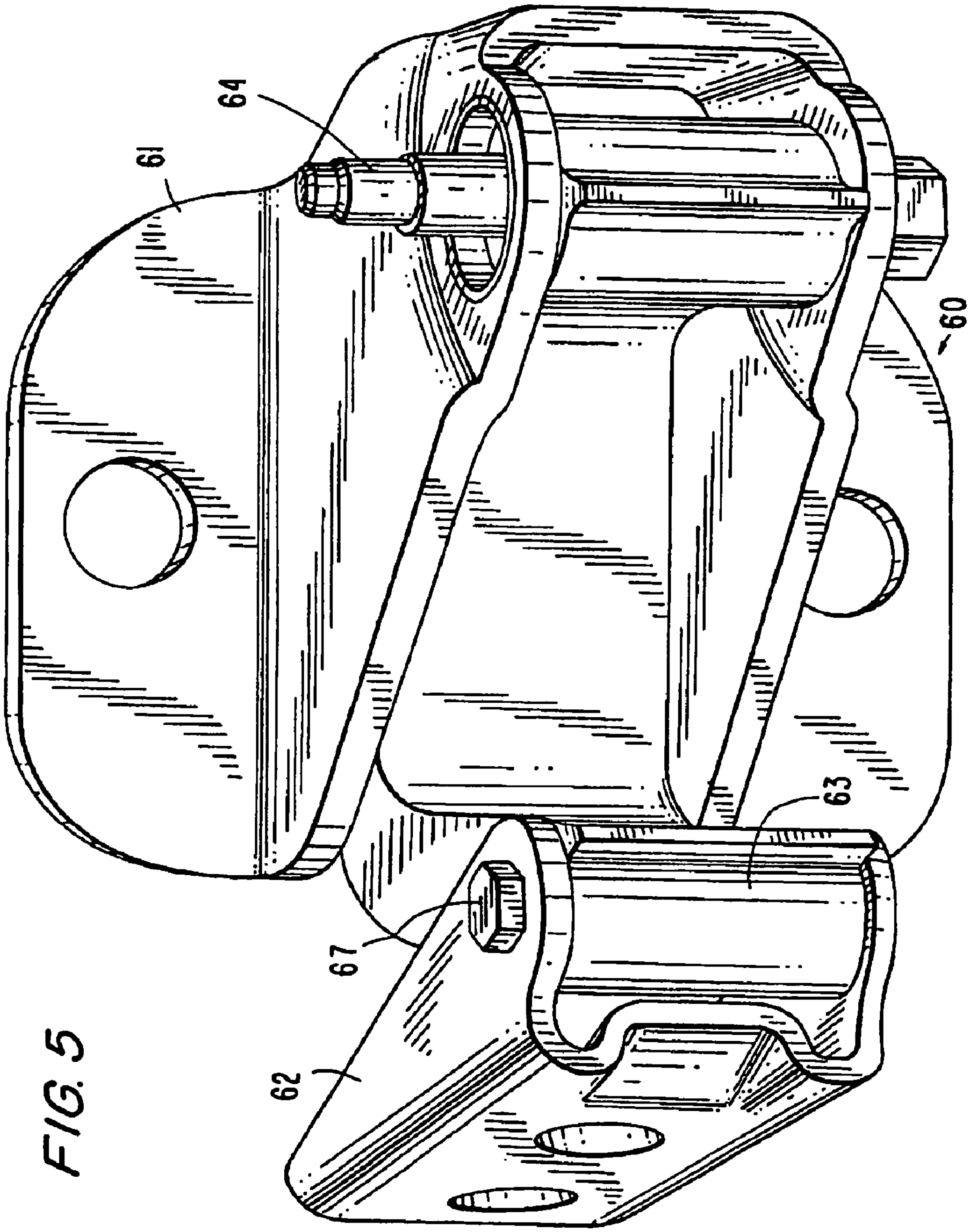
FIG. 5 shows a detailed view of the resistance-free hinge assembly of FIG. 2.

FIG. 5 shows the resistance-free hinge assembly 60 having a U-shaped link 63, a door-side connector 62 and a pillar-side connector 61. Hinge assembly 60 has a similar construction to hinge assembly 20, however the pivots of hinge assembly 60 do not have a braking resistance for the rotation movement. Hinge pins 67 and 64 define resistance-free pivots coaxial with axes 28 and 25, respectively. The lower hinge provides rigidity and stability against torsional twist of the door during door travel.

As shown in FIG. 2, connecting member 40 connects hinge assemblies 20 and 60 and transmits the controlled door movement from the assembly 20 to the assembly 60. Connecting member 40 thus is fixed rotationally to hinge pin 24 and to hinge pin 64, for example by a slot and keyway.

As shown in FIG. 4, pivot 121 and pivot 122 provide two pre-determined different braking resistances, with the braking resistance of pivot 121 being less than that of pivot 122. Thus, an opening of the door causes needle 155 to leave a first notch on cam 160, while needle 55 remains in its first notch in cam 54. The needle 155 can then roll along cam 160 until the intermediate position of the door is reached, at which time a second notch as well as stop 33 can prevent further rotation. The braking resistance of each pivot 121, 122 can be predetermined by a selection of the frictional resistance to the pivotal movement of the sleeve-shaped cam in the receiving notch by selection of the operating diameter of the locking notches and the needle roller diameters and by selection of the spring constants.

A further opening of the door past the intermediate position results in needle roller 55 leaving its first notch and rotating about cam 54 until it reaches another notch corresponding to a fully-open door position. Stop 34 as well then can interact with planar base 39 to prevent the door from opening past the fully-open position (or a position slightly past the fully-open position, but in any case so that the door is prevented from contacting the vehicle body). Thus a full 180 degree open position can be achieved.

When closing the door from the fully-open position, the braking resistance of the door pivot 122 is less than that of the pillar pivot 121, so that needle 55 first exits the second notch of cam 54 and begins to roll about cam 54, while needle 154 remains in the second notch of cam 160. Once needle 54 reached the first notch of cam 54, and thus the intermediate position, door connector 22 is prevented from further rotation with respect to link 23 by virtue of stop 32 acting against planar base 39. Further closing of the door then results in needle 155 exiting the second notch in cam 160 and returning to the first notch and thus the closed door position.

FIGS. 6A, 6B, 7A, 7B, 8A and 8B show this action in more detail.

Figure 6A:
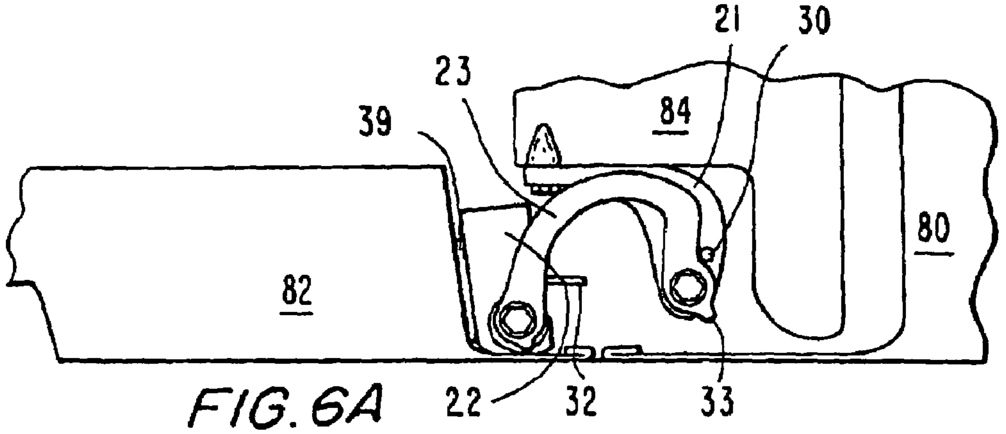

FIG. 6A shows a top view of the door 82 in a fully closed position having a surface aligned with an outer surface of vehicle body 80. Connector 21 is connected to pillar 84, which is part of body 80. Stop 33 is disengaged from pin 30. Stop 32 is connected against planar base 39 of door connector 22.

Figure 6B:
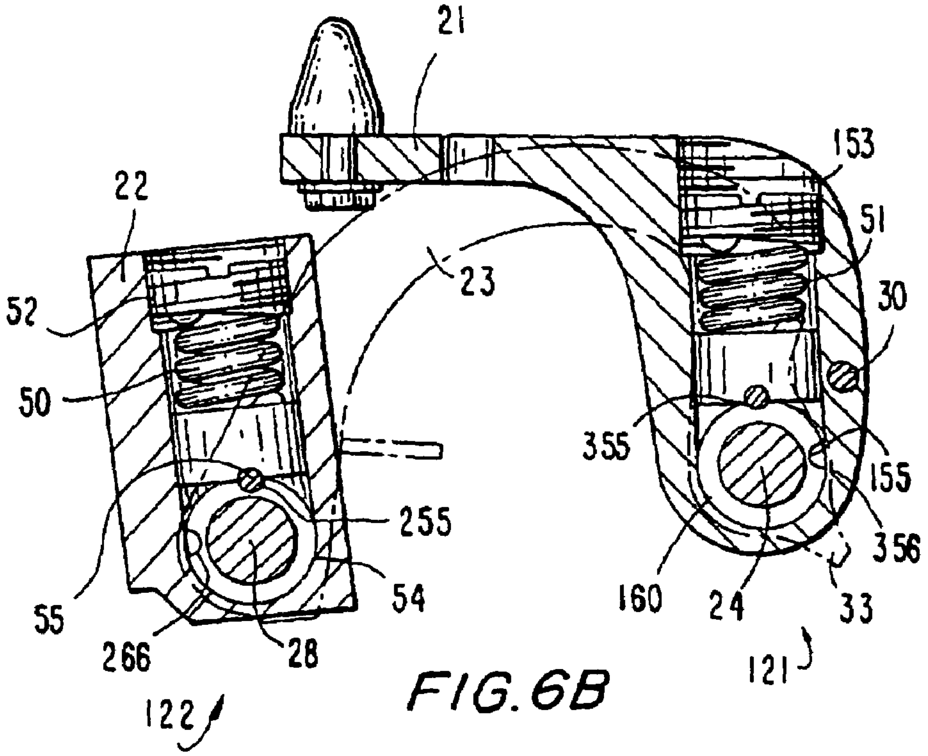
FIG. 6B shows interior details of the hinge assembly in the position shown in FIG. 6A.

FIG. 6B shows more details of the view of FIG. 6A, with needle roller 55 of pivot 122 being in a first notch 255 of cam 54, and with a second notch 266 being spaced about 90 degrees from first notch 255 of cam 54. Needle roller 155 of pivot 121 is in a first notch 355 of cam 160, a second notch 356 of cam 160 being spaced about 90 degrees from first notch 355.

Figure 7A:
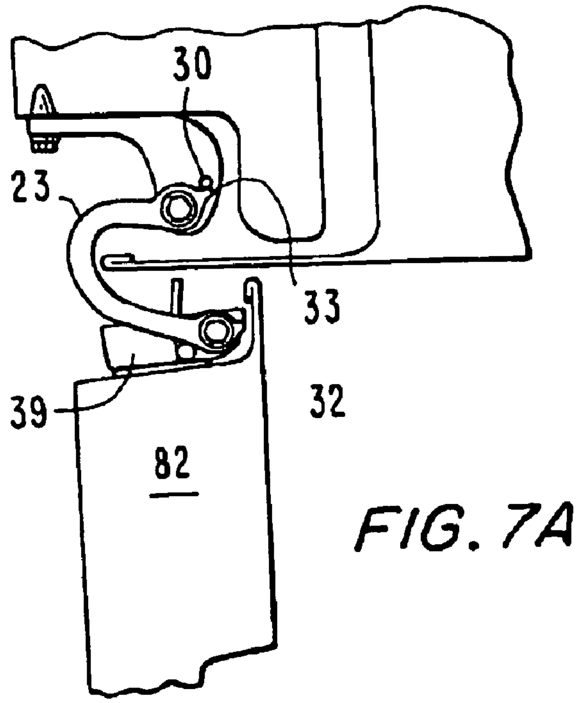
Figure 7B:
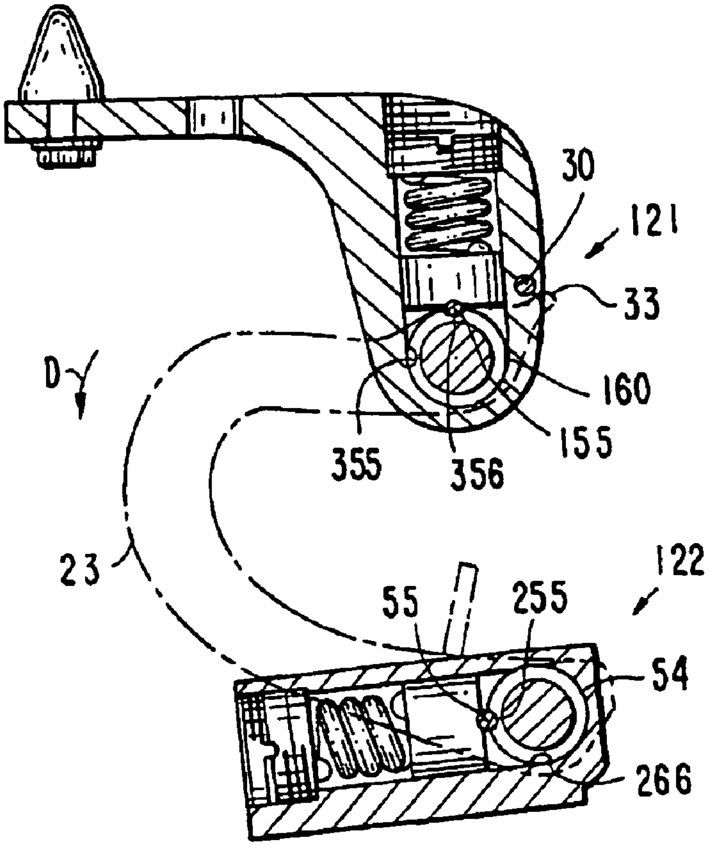
FIG. 7B shows interior details of the hinge assembly in the position shown in FIG. 7A.

The door 82 is opened from the full closed position shown in FIGS. 6A and 6B by actuating the door handle. The torque applied at the door handle tries to rotate the both the body or pillar pivot 121 and the door pivot 122. Because the braking resistance of the body pivot 121 in opening mode is less than that of the door pivot 122, the door rotates at the body pivot 121 to reach a position as shown in FIGS. 7A and 7B. This action moves the door from the closed position at 0° to 90° and stops the door there because the roller 356 enters notch 356 in the cam 160. Stop 33 can also contacts pin 30 to prevent link 23 from rotating any further in counterclockwise direction D.

Figure 8A:
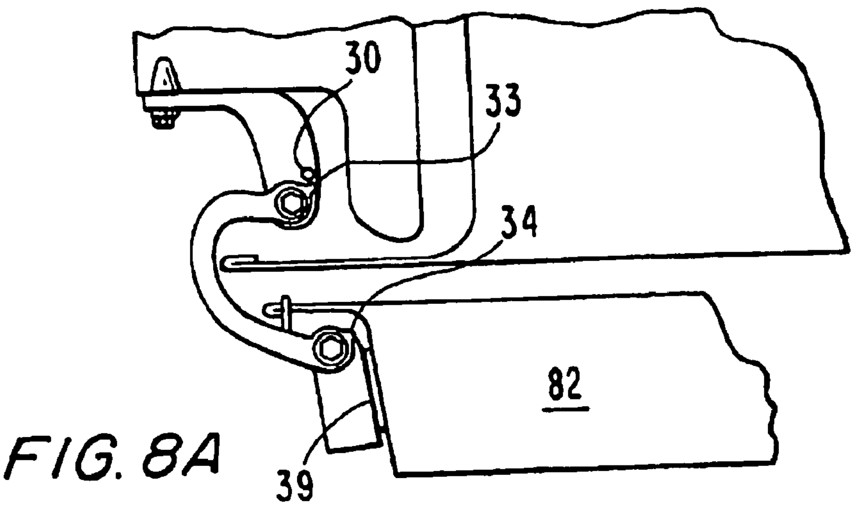
Figure 8B:
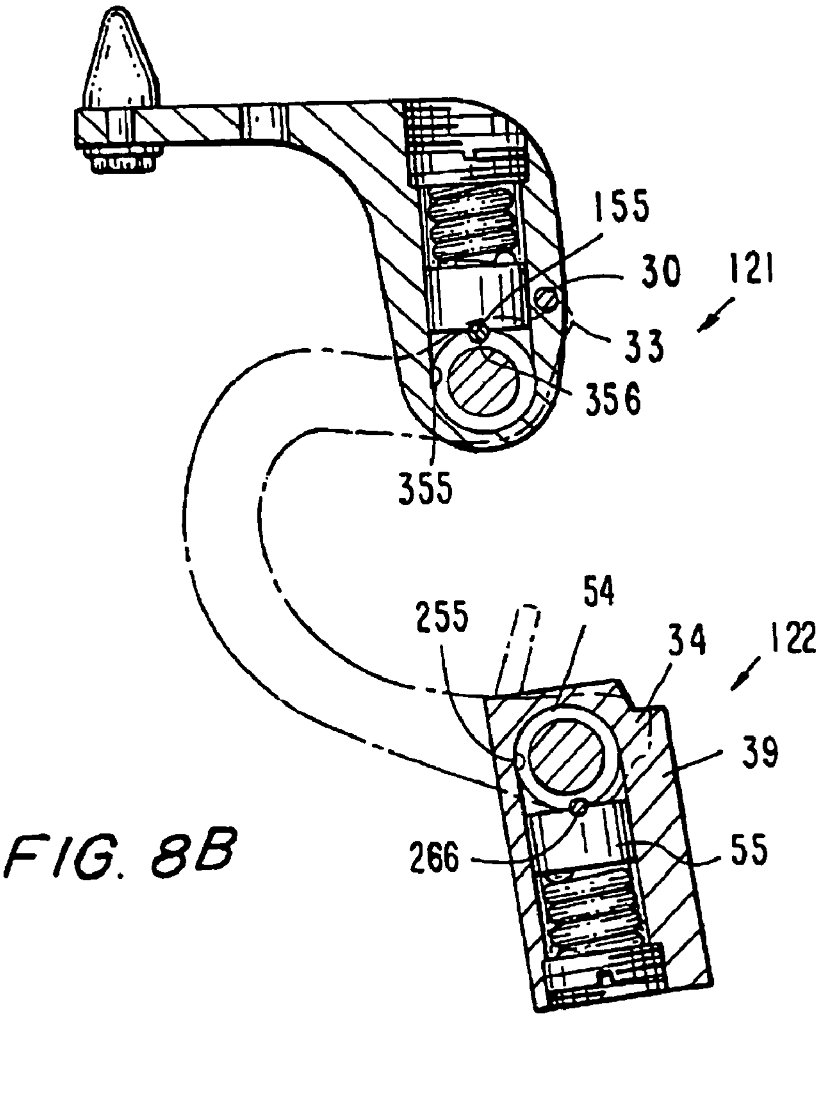
FIG. 8B shows interior details of the hinge assembly in the position shown in FIG. 78.

If the door 82 is further displaced from the position show in FIGS. 7A and 7B by opening to an angle more than 90°, the pivotal torque applied to the door causes the door pivot 122 to activate. As shown in FIGS. 8A and 8B, needle roller 55 leaves notch 255 and rolls about cam 54 until roller 55 enters notch 266, which corresponds to a fully open position, for example an angle of 180°. When the door reaches the full open position of 180° the door pivot 122 is locked in this position.

Stop 34 also interacts with planar base 39, so that further rotation is prevented by this positive stop as well, thus further protecting against more than a 180 degree rotation.

If the door is then closed again to its intermediate position, the double pivot notch-brake hinge 10 pivots about the door pivot 122. This is achieved because the braking resistance of the door pivot 122 is less that the braking resistance of the body pivot 121 during closing. Needle 55 thus moves out of notch 266 and returns to notch 255, while roller 155 remains in notch 356. At this point, further rotation of door 82 in a clockwise direction opposite to direction D is prevented by stop 32 interacting with planar base 39, as shown in FIG. 7A.

Any further torque applied to the door 82 to close the door 82 thus activates the body pivot 121 because the door side pivot 122 cannot further rotate due to positive stop 32. Needle roller 155 thus exits notch 355 and the door pivots about the body pivot 121 closing the door from the intermediate position to 0°.

The terms "pillar" and "body" as used herein are fully interchangeable. "Fully open" as defined herein is solely a desired position of the door past the intermediate position, and need not correspond to a 180 degree door position.

What is claimed is:

1. A double pivot door hinge for a door of a motor vehicle comprising:

a first hinge assembly, the first hinge assembly including a first door connector for connecting to the door of the motor vehicle, a first pillar connector for connecting to a door pillar or body of the motor vehicle, and a first link rotatably connected to the first door connector at a first door-side pivot and rotatably connected to the first pillar connector at a first pillar-side pivot;

a second hinge assembly, the second hinge assembly including a second door connector for connecting to the door and a second pillar connector for connecting to the door pillar or the body, and a second link rotatably connected to the second door connector at a second door-side pivot and rotatably connected to the second pillar connector at a second pillar-side pivot; and a connecting member rigidly joining the first and second hinge assemblies;

wherein the first and second links are u-shaped.

2. The double pivot door hinge of claim 1 wherein the connecting member rigidly joins the first and second links.

3. The double pivot door hinge of claim 1 wherein the first pillar-side pivot comprises a first pin, the second pillar-side pivot comprises a second pin, the first pin is fixedly connected to the first link, the second pin is fixedly connected to the second link, and the connecting member rigidly joins the first and second pins.

4. The double pivot door hinge of claim 3 wherein the connecting member is fixedly connected to the first pin by a slot and keyway.

5. The double pivot door hinge of claim 3 wherein the first pin is fixedly connected to the first link by a slot and keyway.

6. The double pivot door hinge of claim 1 wherein the first door-side pivot comprises a door-side cam and a door-side locking member biased against the door-side cam by a door-side spring to impart a door-side braking resistance between the first link and the first door connector.

7. The double pivot door hinge of claim 6 wherein the first pillar-side pivot comprises a pillar-side cam and a pillar-side locking member biased against the pillar-side cam by a pillar-side spring to impart a pillar-side braking resistance between the first link and the first pillar connector.

8. The double pivot door hinge of claim 7 wherein the pillar-side braking resistance is less than the door-side braking resistance during opening.

9. A double pivot door hinge for a door of a motor vehicle comprising:

a first hinge assembly, the first hinge assembly including a first door connector for connecting to the door of the motor vehicle, a first pillar connector for connecting to a door pillar or body of the motor vehicle, and a first link rotatably connected to the first door connector at a first door-side pivot and rotatably connected to the first pillar connector at a first pillar-side pivot;

a second hinge assembly, the second hinge assembly including a second door connector for connecting to the door and a second pillar connector for connecting to the door pillar or the body, and a second link rotatably connected to the second door connector at a second door-side pivot and rotatably connected to the second pillar connector at a second pillar-side pivot; and a connecting member rigidly joining the first and second hinge assemblies;

wherein a rotation of the first link at the first door-side pivot is resisted by a first braking resistance between the first link and the first door connector and a rotation of the first link at the first pillar-side pivot is resisted by a second braking resistance between the first link and the first pillar connector, the second braking resistance being less than the first braking resistance during opening.

10. The double pivot door hinge as recited in claim 9, wherein the second hinge assembly is a resistance-free hinge assembly.

11. The double pivot door hinge as recited in claim 9, wherein the connecting member rigidly joins the first and second links.

12. The double pivot door hinge as recited in claim 11, wherein the first link, the second link, and the connecting member are separate parts rigidly connected to each other.

13. The double pivot door hinge as recited in claim 12, wherein the connecting member is an elongated member and disposed vertically.

14. The double pivot door hinge as recited in claim 13, wherein the connecting member is longer than the first and second links.

15. The double pivot door hinge as recited in claim 9, wherein a first distance between the first and second hinge assemblies is greater than a second distance between the first door-side pivot and the first pillar-side pivot.

16. The double pivot door hinge as recited in claim 9, wherein the first and second door-side pivots are aligned so as to define a door-side axis of rotation.

17. The double pivot door hinge as recited in claim 16, wherein the first and second pillar-side pivots are aligned so as to define a pillar-side axis of rotation.

18. The double pivot door hinge as recited in claim 17, wherein door-side axis of rotation and the pillar-side axis of rotation are off parallel so as to provide a door assist.

19. The double pivot door hinge as recited in claim 9, wherein the first link is U-shaped and has a first end and a second end and wherein the door-side pivot is disposed at the first end and the first pillar-side pivot is disposed at the second end.

20. The double pivot door hinge as recited in claim 9 wherein the first door-side pivot includes a cam and a locking member biased against the cam by a biasing element to provide a door-side breaking resistance.

21. The double pivot door hinge as recited in claim 9 wherein the first pillar-side pivot includes a cam and a locking member biased against the cam by a biasing element to provide a pillar-side breaking resistance.

22. A method of opening a vehicle door connected to a vehicle pillar by a double pivot door hinge comprising a door-side pivot connected to the door, a pillar-side pivot connected to the pillar, and a link connecting the door-side pivot and pillar-side pivot, the method comprising the steps of:

opening the door from a closed position to an intermediate position while overcoming a pillar-side resistance between the pillar-side pivot and the link while simultaneously failing to overcome a door-side resistance between the door-side pivot and the link, thereby causing the link to rotate about the the pillar-side pivot while the link remains rotationally stationary about the door-side pivot;

opening the door from the intermediate position to a fully-open position while overcoming the door-side resistance, thereby causing the link to rotate about the the door-side pivot.

23. A method of opening a vehicle door connected to a vehicle pillar by a double pivot door hinge comprising a first door-side pivot connected to the door, a first pillar-side pivot connected to the pillar, and a first link connecting the first door-side pivot and first pillar-side pivot, and a second door-side pivot connected to the door, a second pillar-side pivot connected to the pillar, and a second link connecting the second door-side pivot and second pillar-side pivot, and a connecting member rigidly connecting the first link and second link, the method comprising the steps of:

opening the door from a closed position to an intermediate position while overcoming a pillar-side resistance between the first pillar-side pivot and the first link while simultaneously failing to overcome a door-side resistance between the first door-side pivot and the first link, thereby causing the first link to rotate about the the first pillar-side pivot while the first link remains rotationally stationary about the first door-side pivot;

simultaneously with the foregoing step, transmitting the movement of the first link to the second link through the connecting member, thereby causing the second link to rotate about the the second pillar-side pivot while the second link remains rotationally stationary about the second door-side pivot;

opening the door from the intermediate position to a fully-open position while overcoming the door-side resistance, thereby causing the first link to rotate about the the first door-side pivot;

simultaneously with the foregoing step, transmitting the movement of the first link to the second link through the connecting member, thereby causing the second link to rotate about the the second door-side pivot while the second link remains rotationally stationary about the second pillar-side pivot.

* * * * *